United States Patent
Pudenz (10) Patent No.: US 10,331,995 B2
(45) Date of Patent: Jun. 25, 2019

(54) ANTENNA FOR AN RFID READING APPARATUS AND METHOD FOR TRANSMITTING AND/OR RECEIVING RFID SIGNALS

(71) Applicant: SICK AG, Waldkirch (DE)

(72) Inventor: Florian Pudenz, Waldkirch (DE)

(73) Assignee: SICK AG, Waldkirch (DE)

( * ) Notice: Subject to any disclaimer, the term of this patent is extended or adjusted under 35 U.S.C. 154(b) by 0 days.

(21) Appl. No.: 15/887,053

(22) Filed: Feb. 2, 2018

(65) Prior Publication Data

US 2018/0247177 A1    Aug. 30, 2018

(30) Foreign Application Priority Data

Feb. 27, 2017 (EP) .................................... 17158117

(51) Int. Cl.
*G06K 19/06* (2006.01)
*G06K 19/077* (2006.01)
(Continued)

(52) U.S. Cl.
CPC ... *G06K 19/07773* (2013.01); *G06K 7/10346* (2013.01); *G06K 19/0723* (2013.01);
(Continued)

(58) Field of Classification Search
CPC ......... G06K 19/0723; G06K 19/07773; G06K 7/10346; H01Q 1/2216; H01Q 21/24; H01Q 9/42
(Continued)

(56) References Cited

U.S. PATENT DOCUMENTS 5,835,063 A     11/1998  Brachat et al.
7,657,243 B2 *   2/2010  Yoon .................... H01Q 1/2216
                                                        343/824
(Continued)

FOREIGN PATENT DOCUMENTS

CN      103606756 A     2/2014
CN      203895604 U    10/2014
(Continued)

OTHER PUBLICATIONS

Lee, Soo-Ji, et al."Planar Square Quadrifilar Spiral Antenna for Mobile RFID Reader"; Proceedings of the 9th European Radar Conference; Oct. 31-Nov. 2, 2012; Amsterdam, The Netherlands.
(Continued)

*Primary Examiner* — Thien M Le
(74) *Attorney, Agent, or Firm* — Nath, Goldberg & Meyer; Jerald L. Meyer; Stanley N. Protigal (57) ABSTRACT

An antenna (100) for an RFID reading apparatus having a plurality of single antennas (10) of the inverted-F type, wherein the single antennas (10) are arranged in a plane and are arranged tilted with respect to one another within the plane, and having a feed circuit (16) that is connected to the single antennas (10) to control the single antennas (10) to generate a circular polarization having a mutual phase offset corresponding to the tilt is provided. The antenna (100) in this respect has at least four single antennas (10a-d), the single antennas (10a-d) are arranged in a direction of rotation, and the antenna (100) has a common ground plane (20, 28) in parallel with the plane.

16 Claims, 6 Drawing Sheets

(51) Int. Cl.
  *H01Q 1/22* (2006.01)
  *H01Q 9/42* (2006.01)
  *H01Q 21/24* (2006.01)
  *G06K 7/10* (2006.01)
  *G06K 19/07* (2006.01)

(52) U.S. Cl.
  CPC ............ *H01Q 1/2216* (2013.01); *H01Q 9/42* (2013.01); *H01Q 21/24* (2013.01)

(58) Field of Classification Search
  USPC ....................................................... 235/492
  See application file for complete search history.

(56) References Cited

U.S. PATENT DOCUMENTS

| | | | |
|---|---|---|---|
| 2006/0145926 A1* | 7/2006 | Choi | H01Q 1/22 343/700 MS |
| 2009/0179816 A1 | 7/2009 | Chen et al. | |
| 2011/0018774 A1 | 1/2011 | Kikin | |
| 2012/0077447 A1* | 3/2012 | Rofougaran | H01L 23/66 455/73 |
| 2012/0299789 A1* | 11/2012 | Orban | H01Q 9/0421 343/770 |
| 2014/0242903 A1 | 8/2014 | Deluis et al. | |
| 2016/0232388 A1* | 8/2016 | Van Zon | G06K 7/10346 |
| 2017/0092090 A1* | 3/2017 | Lerner | G06K 7/10366 |

FOREIGN PATENT DOCUMENTS

| | | |
|---|---|---|
| JP | 201597339 A | 5/2015 |
| JP | 201625480 A | 2/2016 |

OTHER PUBLICATIONS

European Search Report dated Aug. 10, 2017 corresponding to application No. 17158117.6-1927.

* cited by examiner

ANTENNA FOR AN RFID READING APPARATUS AND METHOD FOR TRANSMITTING AND/OR RECEIVING RFID SIGNALS

FIELD

The invention relates to an antenna for an RFID reading apparatus for an RFID reading apparatus having a plurality of single antennas of the inverted-F type, wherein the single antennas are arranged in a plane and are arranged tilted with respect to one another within the plane, and having a feed circuit that is connected to the single antennas to control the single antennas to generate a circular polarization having a mutual phase offset corresponding to the tilt. The invention further relates to a method for transmitting and/or receiving RFID signals.

BACKGROUND

RFID reading apparatus serve for the identification of objects and products and are used inter alia to automate logistical movements. RFID transponders fastened to the products are read out at an identification point, above all on a change of the owner of the product or on a change of the transport means, and information is optionally written back into the transponder. The detected information is used to control the forwarding and sorting of goods and products. Important applications for automatic identification are logistical distribution centers, for instance of package shippers, or the baggage check-in at airports.

The RFID reading apparatus excites RFID transponders located in its reading range by electromagnetic radiation via its antenna to emit the stored information, receives the corresponding transponder signals and evaluates them. For this purpose, the UHF (ultra-high frequency) range is frequently used since there is an established framework here in the standard ISO 18000-6 and in addition transponders at different distances from some millimeters up to several meters can be read out. UHF RFID transponders are available in very compact construction designs and can also accordingly be attached to very small objects. RFID reading apparatus in the UHF range are, however, not usable for a number of applications, for example in a milling machine for recognizing the milling tools used, in the currently available construction designs due to the housing size.

There is therefore a need for particularly compact designs of the antennas that take up as little construction space as possible within the RFID reading apparatus. The required antenna size in this respect, however, generally depends on the frequency. This is in turn not a free parameter since, for example, a frequency range between 850 MHz and 950 MHz is provided for UHF, within which range frequencies can be used which are determined for specific countries. An antenna for an RFID reading apparatus can therefore not easily adopt a base surface of less than $\lambda/4 \times \lambda/4$, where $\lambda$ is the wavelength of the RFID signal.

It is admittedly conceivable in some applications to work with very small external antennas; however, this means an additional installation effort. In addition, known antennas for the RFID range that allow a smaller housing size than $\lambda/4$ at all are linearly polarized or have such a small antenna gain that transponders can only be read in direct contact or at best up to a distance of some few centimeters. However, circularly polarized antennas or at least elliptically polarized antennas are preferably used in RFID reading apparatus to supply transponders with energy in all angular positions and to read them out. A further demand on the antenna is robustness with respect to interference in the environment such as metal surfaces next to or behind the RFID reading apparatus or additional dielectrics directly in front of the antenna. There are no antennas that combine these criteria within themselves.

So-called inverted-F antennas are known in the prior art that are installed in a number of compact and portable devices. These antennas have their name due to their F shape. The bars are formed from the infeed line and from an additional lateral short-circuit connection to the ground plane, the vertical line is the actual antenna arm. A frequently particularly flat and compact construction shape is the so-called PIFA antenna (PIFA, planar inverted F-antenna) that can be directly integrated on a circuit board as a patch antenna in a microstrip technique. A disadvantage of these antennas in RFID applications is, however, their linear polarization.

US 2009/0179816 A1 discloses an antenna system having two PIFAs that are arranged at a right angle to one another in a plan and at their bases. One of the PIFAs is controlled with a phase offset of 90° to generate waves that are circularly polarized overall. No good circular polarization is achieved with the oppositely disposed alignment that is with the fact that both PIFAs face away from the common base and with the use of only two PIFAs. In addition, there are no measures to direct the radiation of the antenna in a preferred direction.

CN 203 895 604 U combines a total of eight inverted-F antennas in two subgroups of four respective antennas via a feed network for a circularly polarized antenna. The antenna is rather large in construction, not solely due to the eight antennas, but because the antenna structure is not flat in itself and the feed network is located on a different plane than the antenna structure. Such a three-dimensional structure with additional geometrical and circuit-board planes additionally means a high effort and thus additional costs, particularly for mass production.

CN 103 606 756 A shows a further circularly polarized antenna composed of four inverted-F antennas that, however, has comparable disadvantages due to its layer construction and due to the antennas being oriented in the layer direction.

Four antennas each having an L-shaped slit are arranged in a plane and are connected to a feed network that is not located at the same plane in US 2012/0299789 A1.

Different construction shapes are presented in US 2011/0018774 A1 by which a circulation polarization is created with a plurality of monopole antennas and a corresponding feed network. The antennas extend obliquely over a ground plane. A free space internally between the antennas can be used by further elements.

SUMMARY

It is therefore the object of the invention to provide a robust and compact antenna for an RFID reading apparatus.

This object is satisfied by an antenna for an RFID reading apparatus and by a method for transmitting and/or receiving RFID signals in accordance with the respective independent claim. The antenna is based on single antennas of the inverted-F type antenna described in the introduction that are fed with mutual phase offset such that a circular polarization is created. An elliptical polarization having a sufficiently small axial displacement should thus also be covered. The single antennas are arranged in a plane. This, on the one hand, relates to the arrangement of the single antennas with respect to one another that lie in a common plane. However, it also relates to the elements of the single antennas that likewise remain in the same plane. Figuratively speaking, the respective F shape is therefore disposed in the plane instead of standing on the ends of the bars as frequently in the prior art. The single antennas are tilted with respect to one another within the plane in order to generate the circular polarization from the superposition of the respective linear polarization.

The invention now starts from the basic idea of providing at least four single antennas and of aligning them in a direction of rotation. In principle, a circular polarization can also be achieved with two single antennas, but it is then only insufficient. Conversely, six, eight or even more single antennas having a corresponding control are also conceivable, but with the effort typically not justifying the additional benefit. The alignment in the direction of rotation means that the single antennas could be merged into one another without reflection and likewise produces a better circularly polarized signal. A common ground plane in parallel with the plane of the single antennas generates a preferred direction of the radiated signal.

The invention has the advantage that a particularly compact antenna simultaneously having good circular polarization and high antenna gain and a low axial ratio can be set up. Ground planes of less than $\lambda/4 \times \lambda/4$ are also conceivable here. The antenna takes up less construction space and additionally makes it possible to utilize the construction space better in that components, for example of an RFID reading apparatus, are accommodated in a particularly compact manner together with the single antennas. The number of components is reduced by an arrangement in a plane, in particular when the single antennas are integrated on a circuit board. The antenna can be ideally adapted to a desired frequency band without unnecessarily sacrificing reserves for a design with a broader band.

The single antennas are preferably of F shape, with the perpendicular line forming a monopole antenna, but with an additional short-circuit as the upper bar beside a feed point at the lower bar. This corresponds to the basic design of an inverted-F antenna already explained in the introduction.

This single antennas are preferably PIFA antennas (planar inverted-F antennas). The structures of the single antennas are thus formed by microstrips on a circuit board (patch antenna). The specific form of such PIFA antennas can be designed in a very variable manner on the surface of the circuit board, but also even including the circuit board structure in layers, in the depth direction, or on the rear side. The short-circuit lead can, for example, be located on the rear side of the circuit board behind the feed point to reduce the surface requirement. Generally, a large number of degrees of freedom result for the design of the single antennas and for the configuration of the antenna as a whole and of a housing or other component into which the antenna should be integrated.

The antenna preferably has four single antennas in a quadratic arrangement. The single antennas are tilted by 90° with respect to one another and thus form a square. A single antenna here preferably corresponds to a side of the square, but does not have to. Slight deviations from a tilt by 90° are conceivable provided that the effects on the circular polarization are accepted. The four single antennas surround a jacket surface in the interior, with this region in particular also being used for additional circuit structures.

The single antennas preferably each extend over a corner of the quadratic arrangement. In other words, the single antennas themselves form the respective corners and a portion of the adjacent edges of the square. Accordingly, in this embodiment, the direct association of a side of the square with a single antenna is disrupted. An additional design degree of freedom is thereby created.

The single antennas preferably have a widened end region. This end region is again preferably disposed at the base of the vertical line of the F shape. Such a widened portion enables a further shortening of the single antennas and thus overall an even more compact antenna structure.

At least one single antenna in particular preferably has an adaptation in a widened end portion. It is, for example, a chamfer. Influences that do not act in the same way on all single antennas, for example terminals or different housing shapes in the surrounding of a single antenna, can be compensated by individual deviations of the single antennas from one another.

The feed circuit is preferably configured to control four single antennas having a phase offset of +90° in the direction toward a base of a perpendicular line of the F-shaped single antennas. It is clear that a respective phase offset having the amount of 90° is required with four single antennas to achieve a circular polarization. However, this still leaves a sign selection or a selection clockwise or counterclockwise with respect to the single antennas aligned in the direction of rotation. Contrary to the first appearance, this selection is not arbitrary, but rather has large effects on the axial ratio. The specific choice of +90° in the direction toward the base of the vertical line of the F shape therefore produces substantially better antenna properties than would conversely be the case with −90°.

The feed circuit is preferably arranged in the plane between the single antennas. An element required for the circular polarization is thus integrated in a particularly compact manner. The total structure of single antennas and feed circuit furthermore forms a single plane. Alternatively or additionally, other construction elements can be accommodated between the single antennas.

The single antennas are preferably arranged on a circuit board in the plane. An integrated flat antenna structure is thus produced. The circuit board can have further circuits, for instance a feed circuit at the center as explained in the previous paragraph. The rear side of the circuit board can also be used for further construction elements or for a corresponding mounting.

Openings are preferably at least provided in the circuit board in an environment of the single antennas. Corresponding cutouts can be provided for this purpose, for example. Sufficient webs or other regions of the circuit board material remain to maintain the mechanical stability. The dielectric properties of the circuit board have tolerances, in particular on changes to the environmental conditions. The influence of material tolerances is reduced due to the openings, i.e. due to a direct removal of material at points that are not required for the function of the antenna. More constant environmental conditions that coincide better for the single antenna and thus more stable antenna properties are therefore created. The openings can be used for further construction elements, for example for plastic elements to increase the mechanical stability of a housing or of a hood or as an optical beam path for components on a second circuit board in parallel with the circuit board.

The ground plane is preferably formed by a wall of a conductive housing component on which the circuit board is seated with an overhang, with the single antennas being arranged at least partly on the overhang. The housing component is, for example, of parallelepiped shape and is composed of metal. A sufficient spacing is provided by the housing component between the single antennas and further elements of a device that uses the antennas, for example an RFID reading device. The overhang prevents the single antennas from coming into contact with the housing component in an unwanted manner, with such a contact preferably being established at the short circuit and at the infeed of the respective inverted-F antennas. The interior of the housing component can be used as a construction space that is even screened from electromagnetic radiation, in particular of the antenna, in particular for the feed circuit or transmission/reception circuits of the RFID reading device.

The housing component preferably has chamfers and thus extends into the region beneath the overhang as the spacing from the circuit board increases. Such a housing component in particular has the shape of a truncated pyramid. Due to the chamfers, the housing component has practically as little effect on the single antennas as a parallelepiped housing component. However, it provides additional construction space in the interior that would otherwise remain unused.

In a preferred further development, an RFID reading apparatus has an antenna in accordance with the invention. The antenna is in this respect provided for transmitting RFID signals to an RFID transponder and/or for receiving RFID signals from an RFID transponder and the RFID reading apparatus preferably furthermore has an evaluation unit for encoding RFID information into the RFID signals and/or for reading RFID information from the RFID signals. The antenna enables a particularly compact construction shape of the RFID reading apparatus while continuing to cover the required frequency band, for example in the UHF range. Such an RFID reading apparatus is preferably used in a stationary installation at a reading zone of a conveyor or of a reading portal for reading at least one RFID transponder moved on the conveyor or through the reading portal. Due to the antenna in accordance with the invention, such an RFID reading apparatus can be assembled in a few worksteps in a cost-saving manner from a particularly small number of single components. In order only to list some aspects in this respect once more, the number of the assemblies can be reduced by the integration of antenna elements on a circuit board, by additional integration of the feed circuit, and by further construction space on the rear side of the circuit board, at the device center, or in a housing component having the ground plane.

The method in accordance with the invention can be further developed in a similar manner and shows similar advantages in so doing. Such advantageous features are described in an exemplary, but not exclusive manner in the subordinate claims dependent on the independent claims.

BRIEF DESCRIPTION OF THE DRAWINGS

The invention will be explained in more detail in the following also with respect to further features and advantages by way of example with reference to embodiments and to the enclosed drawing. The Figures of the drawing show in.

DETAILED DESCRIPTION

Figure 1:
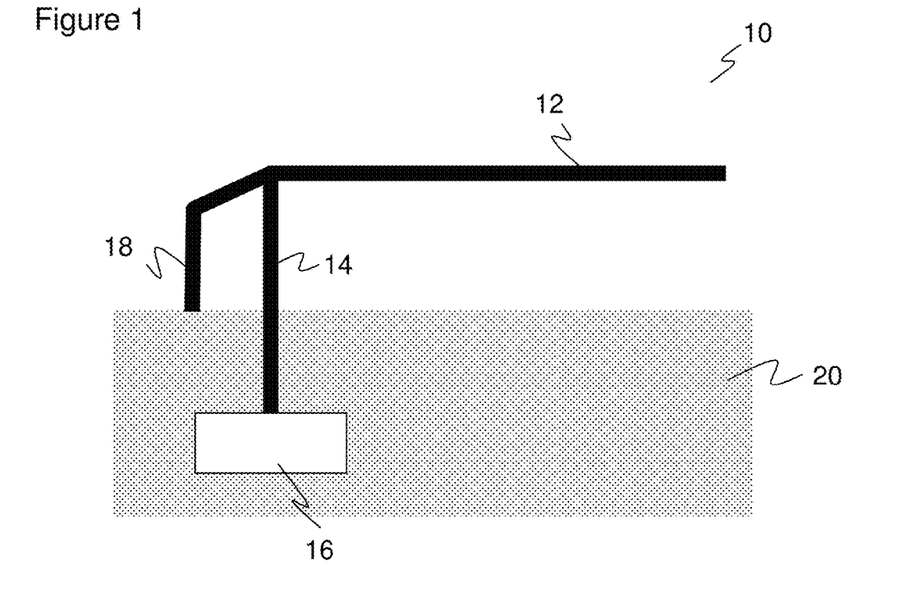
FIG. 1 a schematic representation of the design of an inverted-F antenna.

FIG. 1 schematically shows the design of a single antenna 10 that is configured as an inverted-F antenna. The eponymous F-shape would be even more clearly recognizable in this case after reflection and rotation by 90°. An arm 12 of the single antenna 10 corresponding to the vertical line of the F shape is fed from a feed circuit, only indicated, via a feed line 14 that forms the right bar of the F shape. In a modification of an monopole antenna, an additional short-circuit 18 that forms the left bar of the F shape is provided beside the feed line 14. The length of the monopole antenna can thus be considerably reduced, with respect to a configuration for the same frequency. The construction advantages outweigh the somewhat smaller efficiency and consequently antenna gain in the applications provided here.

If the antenna structure of the single antennas 10 is located, a shown, in a plane with the associated ground plane 20, the term planar inverted-F antenna (PIFA) is also used. Inverted-F antennas, including PIFAs, are only linearly polarized.

A circularly polarized field can, however, be generated by a combination of a plurality of PIFA antennas (on a control with the same power and a corresponding phase offset of 90°).

Figure 2:
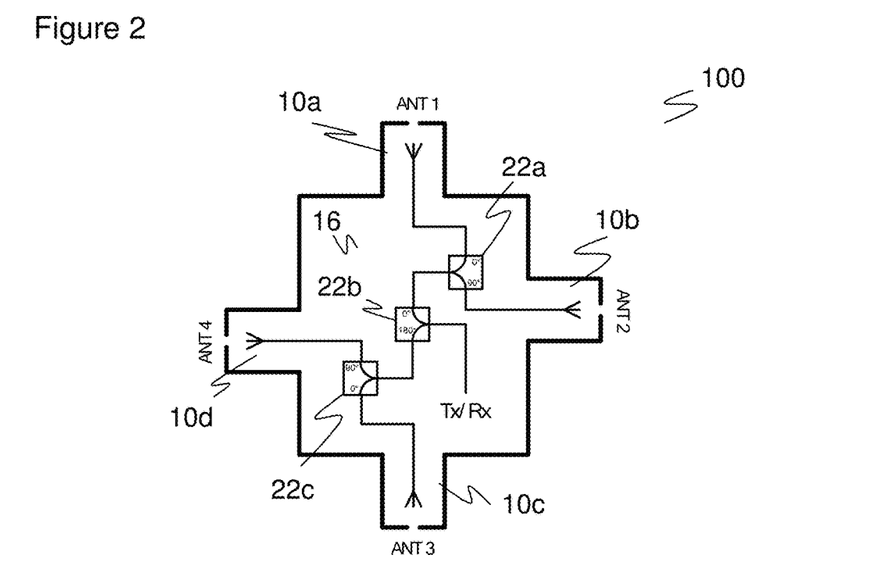
FIG. 2 a block diagram of a circularly polarized antenna composed of four single antennas and of a feed network for its control with a suitable phase offset.

FIG. 2 shows a block diagram of a circularly polarized antenna 100 composed of four single antennas 10*a-b*. Even though the single antennas 10 are only shown symbolically here, they are inverted-F antennas as presented at FIG. 1. A respective single antenna 10*a-d* alone is only suitable with great limitations for use in an RFID reading apparatus due to its linear polarization. This disadvantage is canceled out by the combination of a plurality of single antennas 10*a-d*, whereby a desired polarization, in particular a circular polarization including an approximately circular elliptical polarization, is achievable.

The four single antennas 10*a-d* are tilted by a respective 90° with respect to one another. They are operated with the aid of the feed circuit 16 with an input signal of the same size and with 90° phase offset to generate the circular polarization. The feed circuit 16 is here by way of example a feed network having three 90° power dividers 22*a-c*.

Figure 3:
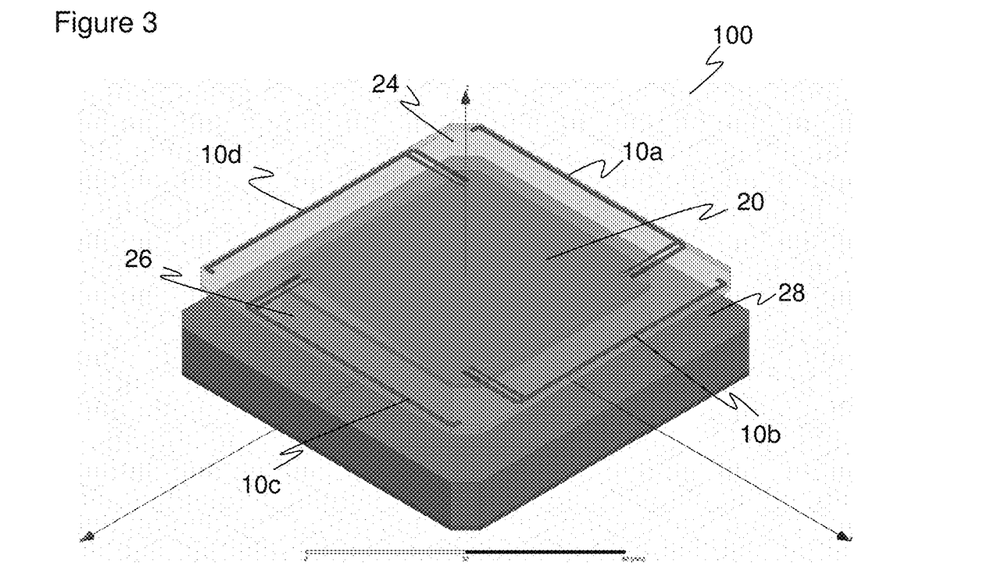
FIG. 3 a three-dimensional view of a circularly polarized antenna composed of four inverted-F antennas in one plane.
Figure 4:
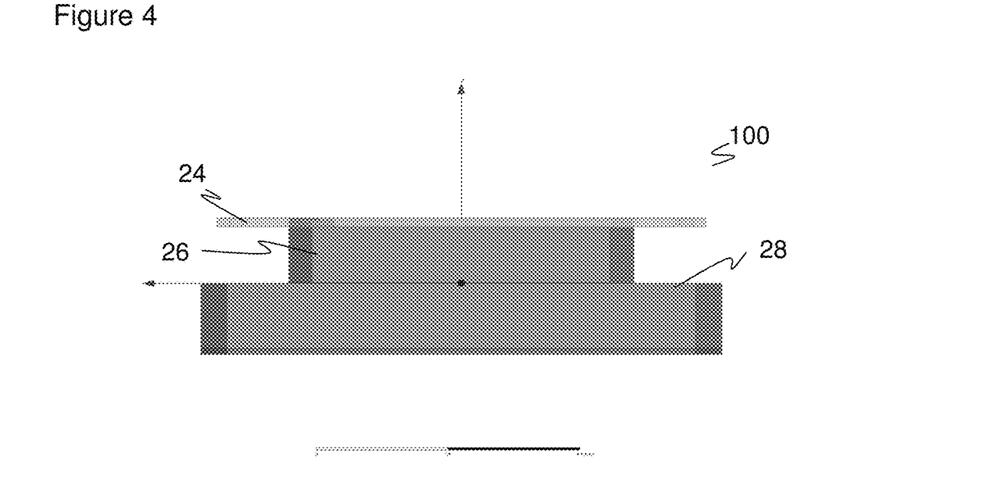
FIG. 4 a side view of the antenna in accordance with FIG. 3.

FIG. 3 shows in a three-dimensional representation an embodiment of an antenna 100 composed of single antennas 10*a-d* that are each configured as four inverted-F antennas and that are disposed in one plane. This not only means that the single antennas 10*a-d* form a plane, but rather also that the single antennas 10*a-d* per se are disposed in the plane. This can be clearly recognized in FIG. 3 where the bars of the respective F shape remain in the same plane. FIG. 4 is a corresponding side view of the antenna 100 in which accordingly no antenna element projects from the plane of the single antennas 10*a-d*.

In this embodiment, the plane is also determined by a circuit board 24 on which the single antennas 10*a-d* are accommodated, in particular in the form of microstrips (PIFA, patch antenna). The ground plane 20, to which the short-circuit 18 is connected, or the feed circuit 16, not shown here, can, for example, also be integrated on this circuit board 24. The possibility accordingly arises due to the transposition of the antenna elements into a circuit board plane to utilize the inner region for mounting. This can also relate to the rear side of the circuit board and to circuit elements such as for the transmission/reception part of an RFID reading apparatus not belonging directly to the antenna.

In the embodiment shown, the circuit board 24 is seated on a conductive, in particular metallic, housing part 26. The housing part 26 is of parallelepiped shape here, with the design also being varied later. The circuit board 24 overhangs in the region of the single antennas 10*a-d* so that there is no unwanted proximity or even a short-circuit. The inner space of the housing part 26 can, for example, be used to satisfy EMC demands as a screened construction space.

A common ground plane 28 beneath or behind the arrangement of the single antennas 10*a-d* serves to generate a direction effect to direct as much of the irradiated energy as possible to the front, for example in the reading direction. The common ground plane 28 can in turn be designed as a housing part, in particular composed of conductive or metallic material, to accommodate further components such as an additional circuit board there.

Figure 5:
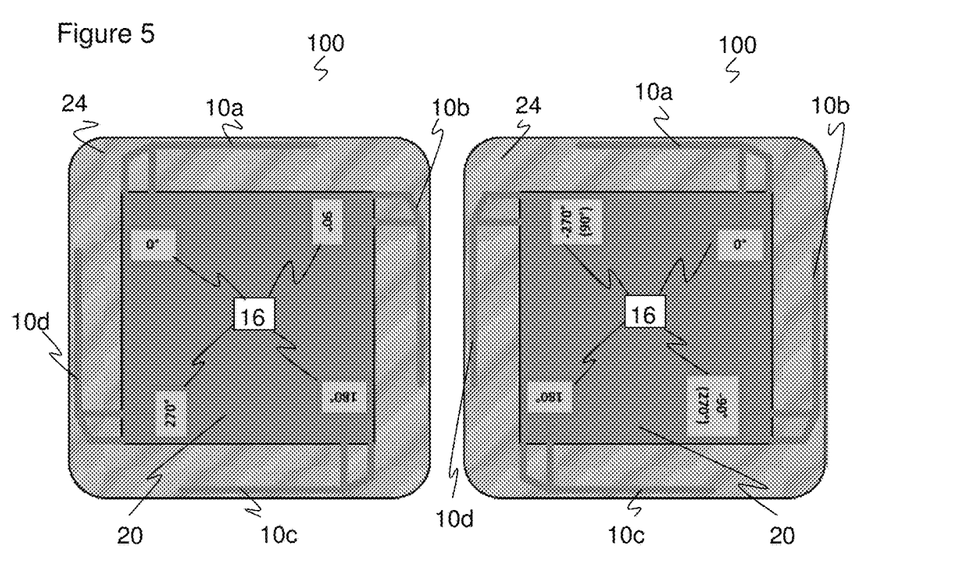
FIG. 5 plan views of a circularly polarized antenna composed of four inverted-F antennas for illustrating an advantageous phase control with a clockwise and counter-clockwise direction of rotation.

FIG. 5 shows two plan views of a respective circularly polarized antenna 100 composed of four single antennas 10*a-b* that are configured as inverted-F antennas. The views in the left and right parts of FIG. 5 differ by the direction of rotation of the single antennas 10*a-d* and by the phase control. As already in FIG. 3, the F shapes are each aligned in a common direction of rotation. This means that single antennas a-d can be merged into one another by tilting and displacing without reflecting them. In other words, the antenna 100 can at least be rotated by a respective 90° with respect to the F shapes and can thereby be merged into itself. Again in other words, the respective base of the vertical line of the F shape of a single antenna 10*a-d* is arranged at the head of the F-shape of the adjacent single antenna 10*a-d*.

There are now two possibilities of alignment in a common direction of rotation, namely clockwise and counterclockwise and these two possibilities are shown in the left and right parts of FIG. 5. As has been determined by the invention, the direction of rotation is of decisive importance for an axial ratio that is as small as possible. The phasing of the feed signals has to be adapted for this purpose depending on the alignment of the single antennas 10*a-d*. A good axial ratio, that is a small axial ratio, results when the phase offset +90°, that is with a positive sign, is predefined for the respective single antenna 10*a-d* that is disposed in the direction of rotation predefined by the base of the F shape. The phase offset in both directions of rotation required for this is drawn in FIG. 5.

If the direction of rotation is swapped over and if the sign of the phase offset is not observed as just explained above, the axial ratio increases considerably and the maximum of the antenna gain is displaced to the rear side of the antenna 100. These disadvantageous effects are even already shown for an ideal antenna 100 on a symmetrical and compact ground plane so that additional degradations are to be anticipated under real conditions, for example in a housing with connector lines that acts unevenly due to design and tolerances.

Figure 6:
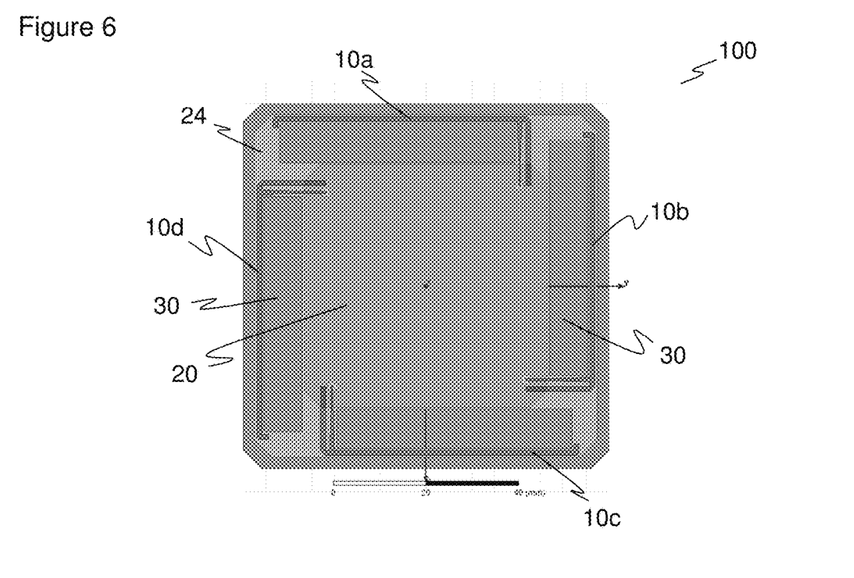
FIG. 6 a plan view of a further embodiment of an antenna with additional cutouts.

FIG. 6 shows a plan view of a further embodiment of an antenna 100. Unlike the previous embodiments, openings 30 are here provided in the circuit board 24 in the environment of the single antennas 10*a-d*. These openings 30 are created, for example, by cutting out and serve to reduce the dependence of the antenna properties on environmental conditions and on material tolerances.

The materials in the environment of the single antennas 10*a-d* influence the function of the antenna 100, specifically its resonant frequency. In this connection, what is decisive is the dielectric constant or the effective ε, that is composed of the $\varepsilon_r$ characteristics of all the non-conductive materials in the environment of the single antennas 10*a-d*. The closer the individual materials are to a single antenna 10*a-d* here and the greater their spatial extent is, the greater their influence.

The materials to be considered here are primarily those of a possible housing and the substrate material of the circuit board 24. A housing typically comprises a homogenous plastic material having exactly determinable dielectric constants that only vary a little and that have hardly any effect due to the comparatively large distances from the single antennas 10*a-d*. The substrate material of the circuit board 24 is in contrast in direct proximity to the single antennas 10*a-d* and therefore has a much greater influence. It is admittedly conceivable to use radio frequency substrate materials having very small tolerance values, but this means considerably higher costs than a standard material such as FR4.

It is therefore advantageous to reduce the volume of the substrate material in the vicinity of the single antennas 10*a-d* through the openings 30. Air having a known dielectric constant is then located there that is also only subject to small variations due to humidity. The single antennas 10*a-d* only occupy a small portion of the circuit board 24 so that the unused regions can, for example, be cut out as openings 30. Individual narrow webs within the openings 30 would also be conceivable to increase the stability; however, a large part of the material can be removed without an effect on the antenna properties. Antennas 100 having smaller tolerances are produced in this manner, in particular in mass production. The openings 30 can additionally be used, for instance, to provide a field of view for an additional optical sensor or an LED on a further circuit board arranged below. The leading through of mechanical reinforcements or supports, for example of an upper housing part on a lower housing part, is also conceivable.

Figure 7:
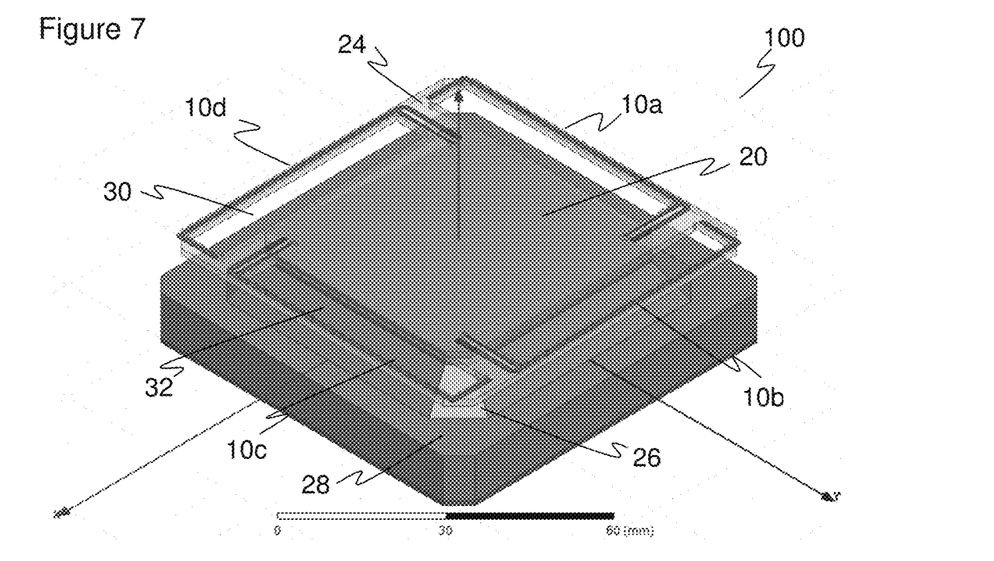
FIG. 7 a three-dimensional view of a further embodiment of an antenna with a housing component in the form of a truncated pyramid.

FIG. 7 shows a three-dimensional view of a further embodiment of an antenna 100. In this view and in following views, the openings 30 can again be recognized that, however, do not necessarily have to be present. The difference to be illustrated by FIG. 7 relates to the housing part 26. A parallelepiped shape was provided here in previous embodiments. The side surfaces 32 of the housing part 26 are now chamfered in accordance with FIG. 7. The shape of a truncated pyramid results from this in this embodiment. Deviating slants at the side surfaces 32 are possible, however. FIG. 7 also shows an additional folded edge in the corner regions that strictly speaking no longer corresponds to a truncated pyramid.

The housing part 26 takes up a portion of the previously free space beneath the single antennas 10a-d due to the chamfered shape. Additional construction space in the interior of the housing part 26 is thereby gained. The spacing from the single antennas 10a-d remains in place due to the chamfer so that the effect of the housing part 26 in accordance with FIG. 7 hardly differs from that of a parallelepiped shape.

Figure 8:
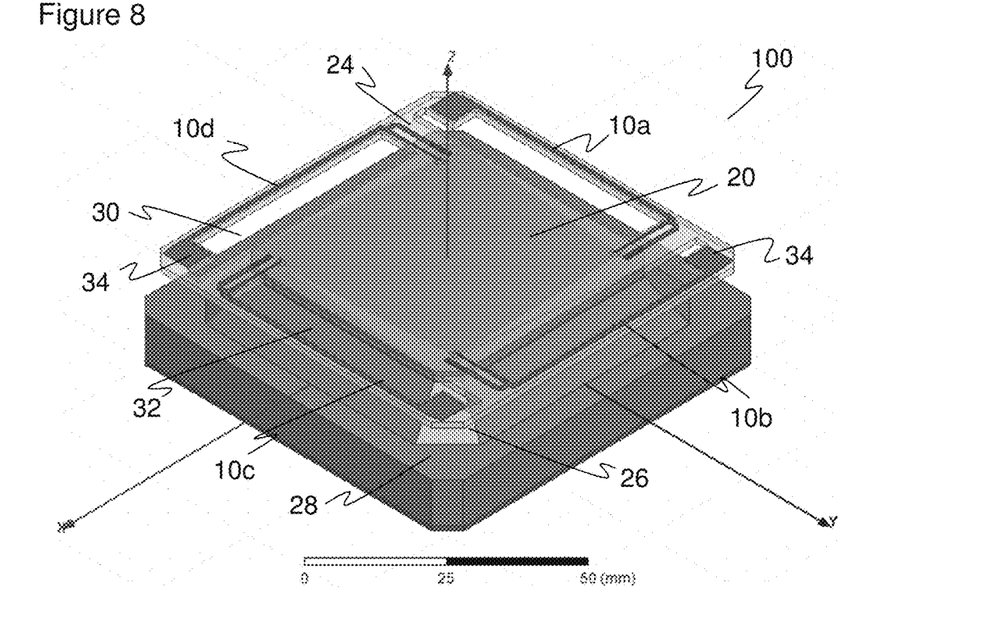
FIG. 8 a three-dimensional view of a further embodiment of an antenna with widened end regions of the individual inverted-F antennas.

FIG. 8 shows a three-dimensional view of a further embodiment of an antenna 100. In this embodiment, the end regions 34 of the single antennas 10a-d are widened, in particular those at the base of the vertical line of the F shape. The total length of the single antennas 10a-d can thereby be reduced with the same resonant frequency.

It is furthermore possible, not illustrated in FIG. 8, to adapt single antennas 10a-d individually by changing the shape. The widened end region 34 is particularly suitable for this that can, for example, be given a chamfer in which a corner region of the end region 34 is practically cut off. Such individual shape adaptations serve to adapt the resonant frequency to compensate influences of the environment that only relate to specific single antennas 10a-d or that relate to different single antennas 10a-d to different degrees. One example is formed by terminal lines or connectors for energy supply and communications that, as additional metallic elements, exert an effect on the single antennas 10a-d and that as a rule are only supplied from one side.

Figure 9:
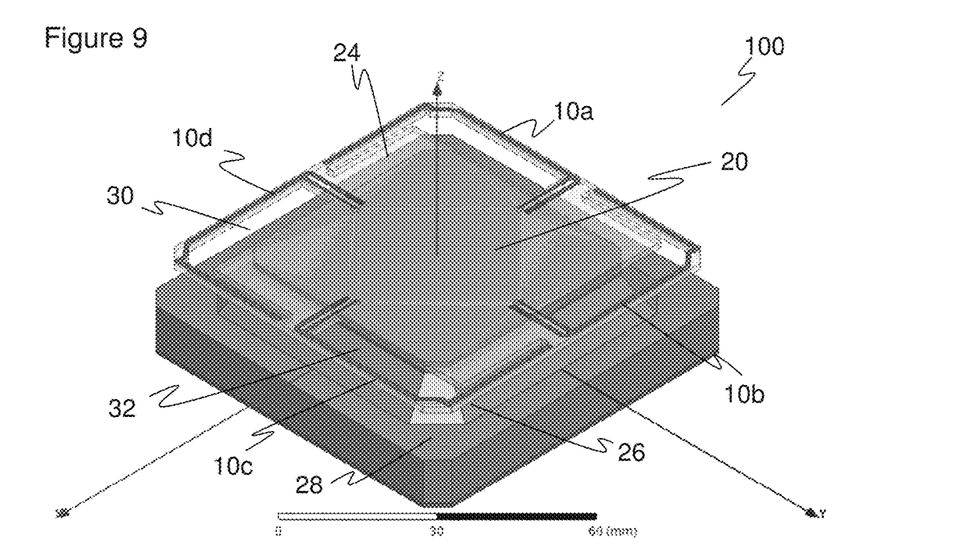
FIG. 9 a three-dimensional view of a further embodiment of an antenna, with the individual inverted-F antennas extending around a corner.

FIG. 9 shows a three-dimensional view of a further embodiment of an antenna 100. In this embodiment, the single antennas 10a-d are not straight and are not arranged as sides of a square, but rather form its corners with an angled shape. The geometry of the housing part 26 and of the ground plane 20 is thereby also changed, which can simultaneously be understood as a further example for the possible shape design of the housing part 26. The feed of the single antennas 10a-d takes place in accordance with the angled arrangement at the center of a side and no longer in the proximity of the corner of the quadratic total arrangement.

Figure 10:
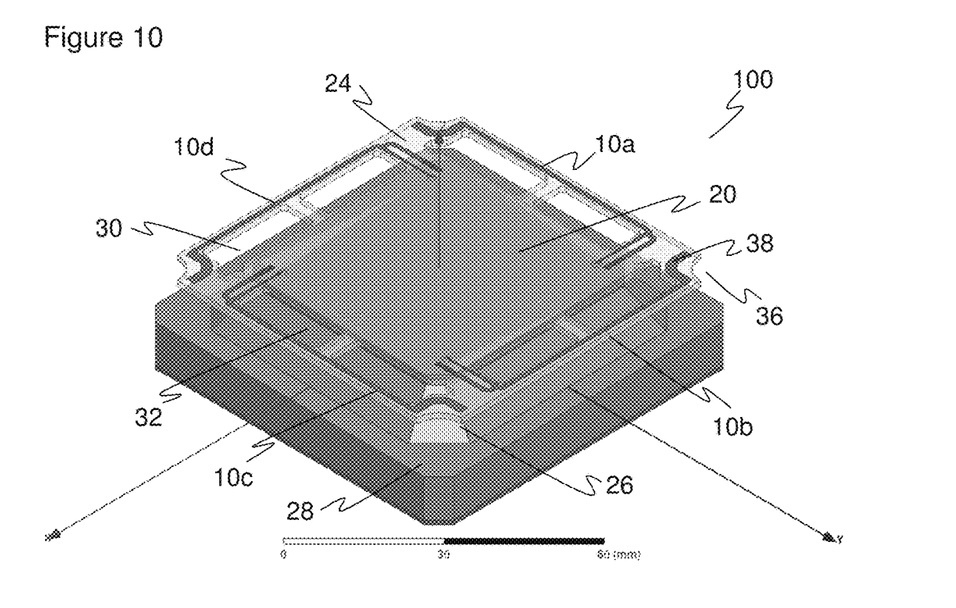
FIG. 10 a three-dimensional view of a further embodiment of an antenna in which recesses for further construction elements are provided in the corner regions.

FIG. 10 shows a three-dimensional view of a further embodiment of an antenna 100. In this embodiment, the single antennas 10a-d are again arranged as sides of a square. To provide a free corner region 36 at which, for example, optical waveguides or mechanical support elements can be arranged, the end regions 38 of the single antennas 10a-d having a rounded corner are led inwardly.

FIGS. 5 to 10 have each been used to explain the variation of a specific feature. However, a plurality of these variations are mostly simultaneously illustrated. This may not be understood as restrictive since other combinations are also possible. A special phase control in dependence on the direction of rotation in accordance with FIG. 5, the application of openings 30 to reduce the dependence of the antenna properties on material tolerances in accordance with FIG. 6, a housing part 26 having chamfered side surfaces 32 in accordance with FIG. 7, single antennas 10a-d having a widened end region in accordance with FIG. 8, or individual adaptations of the single antennas 10a-d, single antennas 10a-d led around the corner in accordance with FIG. 9, and inwardly rounded corner regions of the antenna 100 that thereby remain free in accordance with FIG. 10 are each features that can be combined with one another practically as desired.

Figure 11:
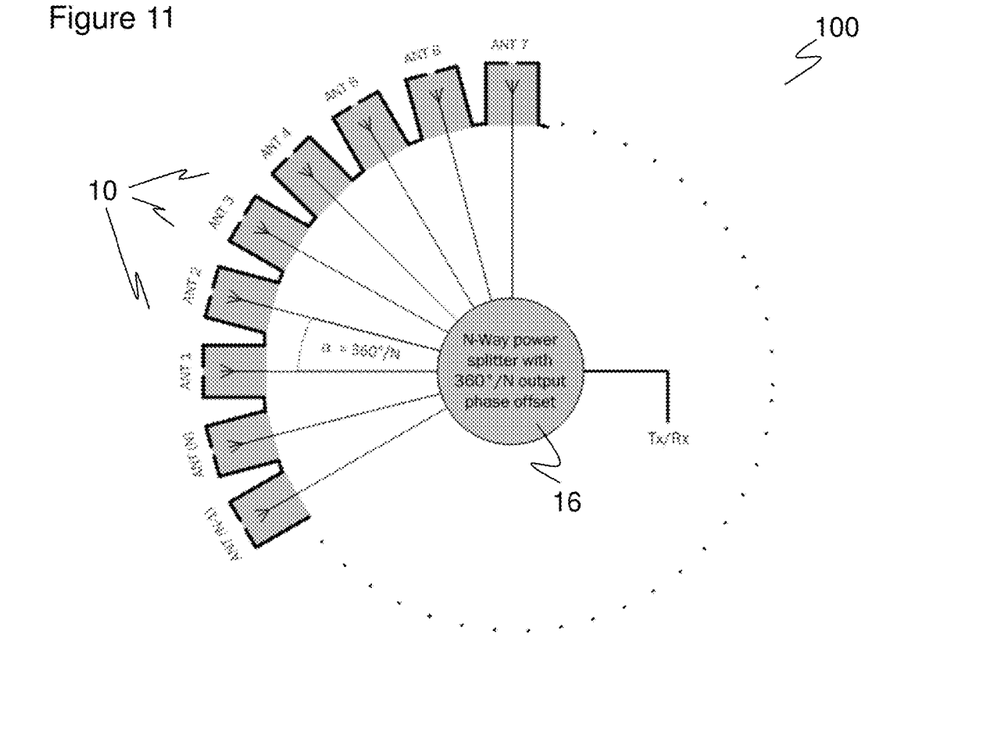
FIG. 11 a block diagram of a generalized circularly polarized antenna composed of n single antennas with a corresponding n-fold power divider for their in-phase control.

Exactly four single antennas 10a-d were provided in the previous embodiments. In most applications, this actually represents an optimum with respect to effort and/or cost, space requirements, losses in the feed circuit 16, and good antenna properties, particularly with regard to circular polarization. FIG. 11 illustrates in a block diagram how, as required, a generalization to n additional single antennas 10 is possible, with an even number being preferred. An antenna 100 having an extremely small axial ratio can thus be implemented that reacts even more robustly to changes in the direct environment. In accordance with FIG. 11, n single antennas 10 are tilted with respect to one another such that they evenly divide 360°. A corresponding feed circuit 16 supplies the single antennas 10 with the matching phase.

The invention claimed is:

1. An antenna for an RFID reading apparatus, the antenna comprising:
   a plurality of single antennas of the inverted-F type, wherein the single antennas are arranged in a plane and are arranged tilted with respect to one another within the plane, and a feed circuit that is connected to the single antennas to control the single antennas to generate a circular polarization having a mutual phase offset corresponding to the tilt, wherein the antenna has at least four single antennas,
   wherein the single antennas are aligned in a direction of rotation,
   wherein the antenna has a common ground plane in parallel with the plane,
   wherein the single antennas are arranged in the plane on a circuit board,
   and wherein openings are provided in the circuit board at least in an environment of the single antennas.

2. The antenna in accordance with claim 1, wherein the single antennas are of F shape, with the perpendicular line forming a monopole antenna, but with an additional short-circuit as the upper bar beside a feed point at the lower bar.

3. The antenna in accordance with claim 1, wherein the single antennas are PIFA antennas.

4. The antenna in accordance with claim 1, wherein the antenna has four single antennas in a quadratic arrangement.

5. The antenna in accordance with claim 4, wherein the single antennas each extend over a corner of the quadratic arrangement.

6. The antenna in accordance with claim 1, wherein the single antennas have a widened end region.

7. The antenna in accordance with claim 1, wherein at least one single antenna has an adaptation.

8. The antenna in accordance with claim 7, wherein the at least one single antenna having the adaptation has the adaptation in a widened end region.

9. The antenna in accordance with claim 1, wherein the feed circuit is configured to control four single antennas having a phase offset of +90° in the direction toward a base of a perpendicular line of the F-shaped single antennas.

10. The antenna in accordance with claim 1, wherein the feed circuit is arranged in the plane between the single antennas.

11. The antenna in accordance with claim 1, wherein the ground plane is formed by a wall of a conductive housing component on which the circuit board is seated with an overhang, with the single antennas being at least partly arranged on the overhang.

12. The antenna in accordance with claim 11, wherein the housing component has chamfers and thus extends into the region beneath the overhang as the spacing from the circuit board increases.

13. An RFID reading apparatus comprising the antenna according to claim 1.

14. A method for transmitting and/or receiving RFID signals by an antenna, the antenna comprising:
   a plurality of single antennas of the inverted-F type, wherein the single antennas are arranged in a plane and are arranged tilted with respect to one another within the plane, and a feed circuit that is connected to the single antennas to control the single antennas to generate a circular polarization having a mutual phase offset corresponding to the tilt, wherein the antenna has at least four single antennas,
   wherein the single antennas are aligned in a direction of rotation,
   wherein the antenna has a common ground plane in parallel with the plane;
   arranging the single antennas in the plane on a circuit board; and
   providing openings in the circuit board at least in an environment of the single antennas.

15. The method of claim 14, wherein the ground plane is formed by a wall of a conductive housing component on which the circuit board is seated with an overhang, with the single antennas being at least partly arranged on the overhang.

16. An antenna for an RFID reading apparatus, the antenna comprising:
   a plurality of single antennas of the inverted-F type, wherein the single antennas are arranged in a plane and are arranged tilted with respect to one another within the plane, and a feed circuit that is connected to the single antennas to control the single antennas to generate a circular polarization having a mutual phase offset corresponding to the tilt, wherein the antenna has at least four single antennas,
   wherein the single antennas are aligned in a direction of rotation,
   wherein the antenna has a common ground plane in parallel with the plane,
   wherein the single antennas are arranged in the plane on a circuit board,
   and wherein the ground plane is formed by a wall of a conductive housing component on which the circuit board is seated with an overhang, with the single antennas being at least partly arranged on the overhang.

* * * * *